(12) United States Patent
Yang et al.

(10) Patent No.: US 6,440,179 B1
(45) Date of Patent: Aug. 27, 2002

(54) PACKAGING METHOD FOR ELECTRIC POWER STORAGE UNITS OF AN ULTRACAPACITOR ENERGY STORAGE DEVICE

(75) Inventors: Chang-Chen Yang, Taipei; Wei-Te Pong, Taoyuan Hsien; Yung-Shang Huang, Taipei Hsien, all of (TW); Keh-Chi Tsai, Saratoga; James M. Lawson, Los Gatos, both of CA (US)

(73) Assignee: National Energy Technology Co., Ltd., Taipei (TW)

( * ) Notice: Subject to any disclaimer, the term of this patent is extended or adjusted under 35 U.S.C. 154(b) by 0 days.

(21) Appl. No.: 09/790,619

(22) Filed: Feb. 23, 2001

(51) Int. Cl.⁷ .............................. H01G 9/00; H01G 9/10; H01G 2/10
(52) U.S. Cl. ...................... 29/25.03; 361/517; 361/518; 361/535; 361/536; 427/79
(58) Field of Search ............................. 29/25.01–25.03; 361/517, 535, 536, 518; 427/79–80

(56) References Cited

U.S. PATENT DOCUMENTS

| | | | |
|---|---|---|---|
| 5,384,685 A | 1/1995 | Tong et al. | 361/503 |
| 5,464,453 A | 11/1995 | Tong et al. | 29/25.03 |
| 5,711,988 A | 1/1998 | Tsai et al. | 27/80 |
| 5,800,857 A | 9/1998 | Ahmad et al. | 427/80 |
| 5,821,033 A | 10/1998 | Cromack et al. | 430/311 |
| 6,152,970 A | * 11/2000 | Wei et al. | 29/25.03 |

\* cited by examiner

Primary Examiner—Ha Tran Nguyen
(74) Attorney, Agent, or Firm—Birch, Stewart, Kolasch & Birch, LLP

(57) ABSTRACT

A packaging method for electric power storage units of an ultracapacitor energy storage device. An electrolyte solution is filled directly during the process of stacking electrodes so as to omit the steps of partially forming and enclosing a refill port. Thus, the fabrication process can be effectively simplified and the production efficiency can be increased. First, an annular glue wall is coated along the border of the top surface of a first electrode. The electrolyte solution is filled on the top surface of the first electrode enclosed by the annular glue wall. A second electrode is then stacked over the first electrode. The annular glue wall is heated to bind the first electrode, the second electrode, and the annular glue wall, thus enclosing the electrolyte solution between the first electrode and the second electrode.

58 Claims, 8 Drawing Sheets

PACKAGING METHOD FOR ELECTRIC POWER STORAGE UNITS OF AN ULTRACAPACITOR ENERGY STORAGE DEVICE

BACKGROUND OF THE INVENTION

1. Field of Invention

The present invention relates to an energy storage device packaging method and, in particular, to a packaging method for electric power storage units of an ultracapacitor energy storage device.

2. Related Art

A battery is a power device that converts energy of a certain form directly into electrical power without going through an intermediate mechanical conversion process. A capacitor is an electronic device that stores charges. In general, batteries can store a large amount of energy but have a lower output power, while capacitors store little energy but can have a high output power. Therefore, batteries are considered as an electrical power storage device and capacitors are power storage devices. They are used by human beings in various applications.

With the arrival of the 3C (computer, communications, and consuming electronics) era, light, thin, short and small electronic products with multiple functions and high efficiency are more and more popular in our daily lives. Such products include notebook computers, mobile phones, walkmans, etc. To make electronic products portable and good for long term uses, a sufficient portable power supply becomes the key problem. Conventional combinations of batteries and capacitors obviously cannot satisfy modern uses. A new energy storage device, the ultracapacitor, has thus been invented.

Conventional capacitors use an insulating material or a dielectric sandwiched between two conductors to achieve the isolation effect. The capacitance is produced by separating opposite charges on the conductor surfaces.

The electrochemical double layer (EDL) adopted in ultracapacitor energy storage devices does not have an insulating material to establish a dielectric layer. The charging and energy storage occurs at the interface of the EDL. The ultracapacitor can achieve an energy density and a power density far higher than the conventional capacitor technology can. In comparison with conventional batteries, ultracapacitors can release more than 100 times of power and store over 20 times of electrical energy.

Currently, ultracapacitor energy storage devices have gone from the experimental phase into a few commercialized applications. The product applications also gradually move from defensive satellites and military uses to products in vehicle, mechanical-electrical and communication electronics industries.

Please refer to FIGS. 1A and 1B for the structure and the fabrication method of a conventional ultracapacitor energy storage device. The method proposed in the U.S. Pat. No. 5,384,685, 5,464,453, 5,711,988, 5,800,857, and 5,821,033 is to dispose two gaskets 12 between two electrodes 11. A block 13 is sandwiched between the two gaskets 12, forming a stack structure 10. The gasket is formed by using a polymer gel to form a film and then cutting off the shape needed. The large surface covering layer 16 of the inner surface of the electrode 11 can be formed with a proper little bump 17 to help supporting and insulating the two electrodes 11.

Afterwards, the two gaskets 12 are heated for reflowing so as to bind the two electrodes 11 and the two gaskets 12 together, forming an enclosed gap 15 in the stack structure 10.

After cooling to the room temperature, the block 13 is withdrawn to form a refill port 14 on a side surface of the stack structure 10. An electrolyte solution is filled into the gap 15 inside the stack structure 10 through the refill port 14. Finally, the refill port 14 is closed to complete the packaging of an electric power storage unit.

However, the above packaging method has to form a gasket by making a film from polymer gel and cutting the shape needed in order to make the stack structure and refill port of the electric power storage unit before putting in the electrolyte solution and enclosing the refill port. The process is too complicated and not suitable for mass production. Therefore, it is desirable to have a new packaging method that solves the above problems.

SUMMARY OF THE INVENTION

In view of the foregoing, the invention provides a packaging method for electric power storage units of an ultracapacitor energy storage device that has a simplified procedure and is suitable for mass production.

The disclosed packaging method directly fills in an electrolyte solution during the electrode stacking process, omitting the steps of scraping electrode sides, making polymer gel films, cutting the shape needed, and forming and enclosing a refill port. Therefore, it largely simplifies the process, increases the production efficiency and lowers the cost.

The packaging method includes the following steps:

Coating a glue wall: coating an annular glue wall along the upper surface border of a first electrode;

Filling in an electrolyte solution: filling an electrolyte solution in the upper surface of the first electrode enclosed by the annular glue wall;

Stacking electrodes: stacking a second electrode on the first electrode;

Reflowing the glue wall: heating to reflow the annular glue wall to bind the first electrode, the second electrode, and the annular glue wall together, enclosing the electrolyte solution between the first electrode and the second electrode.

The annular glue wall is composed of materials that are acid-resistant and adhesive to the electrode. For example, the material can be a thermal plastic resin that can be heated for reflowing and congregation.

The lower surface of the second electrode can be formed with a second annular glue wall, corresponding to the first annular glue on the upper surface of the first electrode. The first annular glue wall and the second annular glue wall can be heated and reflowed to enclose the electrolyte solution so that the electric power storage unit has a good closure.

In the step of coating a glue wall, hot air, infrared, ultraviolet or radiation heating can speed up the congregation of the annular glue walls. The heat source in the step of reflowing the glue wall can be ultrasonic waves, hot air or infrared light.

A separation plate can be installed on the upper surface of the first electrode as the support structure of the electric power storage unit, preventing a direct contact between the two electrodes due to bending. The separation plate has to have the properties of being porous, acid-resistant, and thin, such as a glass fiber plate.

BRIEF DESCRIPTION OF THE DRAWINGS

The present invention will become more fully understood from the detailed description given hereinbelow illustration only, and thus are not limitative of the present invention, and wherein:

FIGS. 2A and 2B show a printing tool in an embodiment of the invention, wherein FIG. 2B is a cross-sectional view of FIG. 2A along the a–a' direction;

FIGS. 3A and 3B show an electrode formed on the printing tool according to the embodiment of the invention, wherein FIG. 3B is a cross-sectional view of FIG. 3A along the b–b' direction;

FIGS. 5A and 5B show an annular glue wall formed on the electrode according to the embodiment of the invention, wherein FIG. 5B is a cross-sectional view of FIG. 5A along the c–c' direction;

DETAILED DESCRIPTION OF THE INVENTION

Figure 1A:
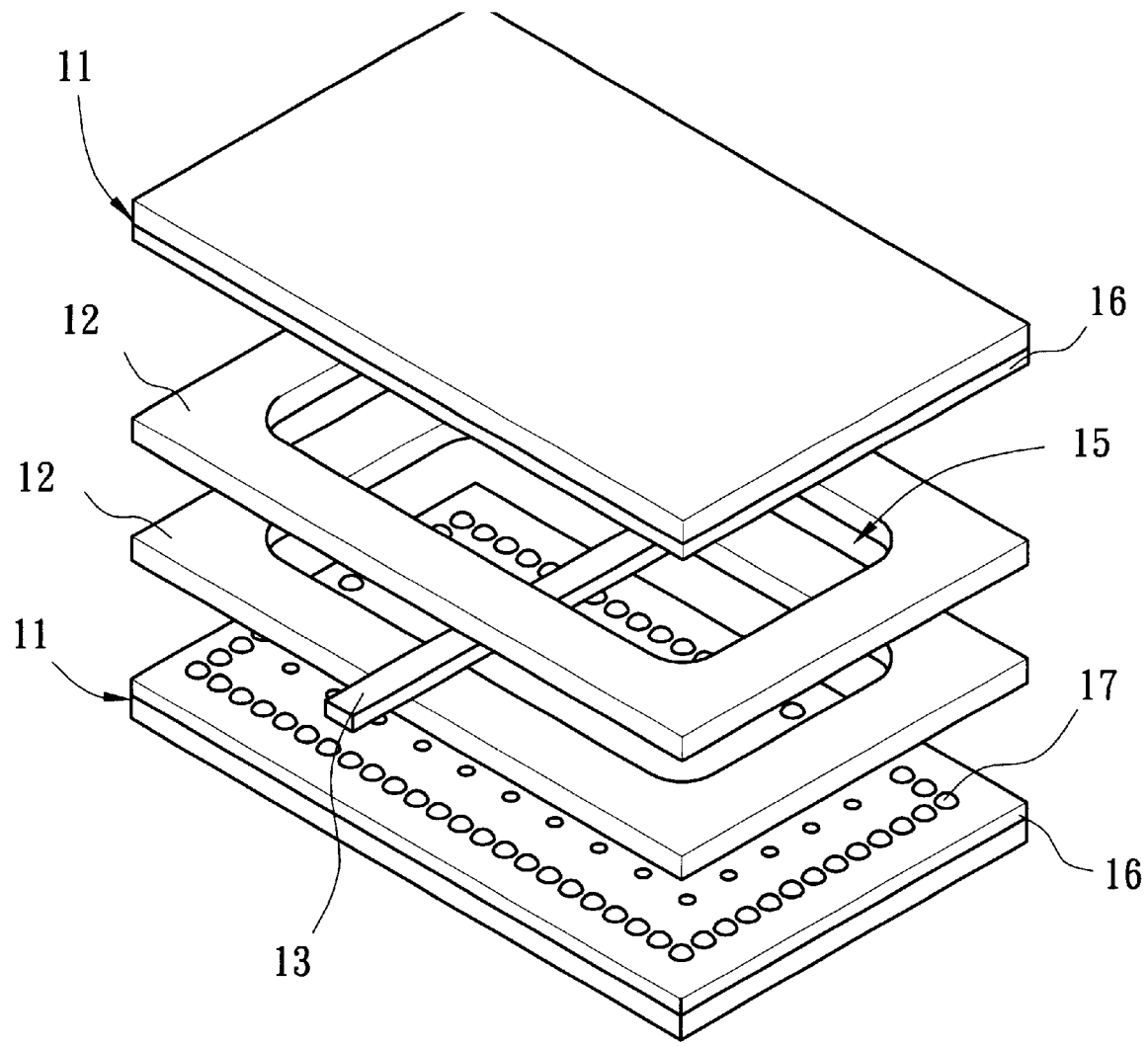
FIG. 1A shows a three-dimensional perspective view of the stack structure of the electric power storage units of an ultracapacitor energy storage device in the prior art before packaging.
Figure 1B:
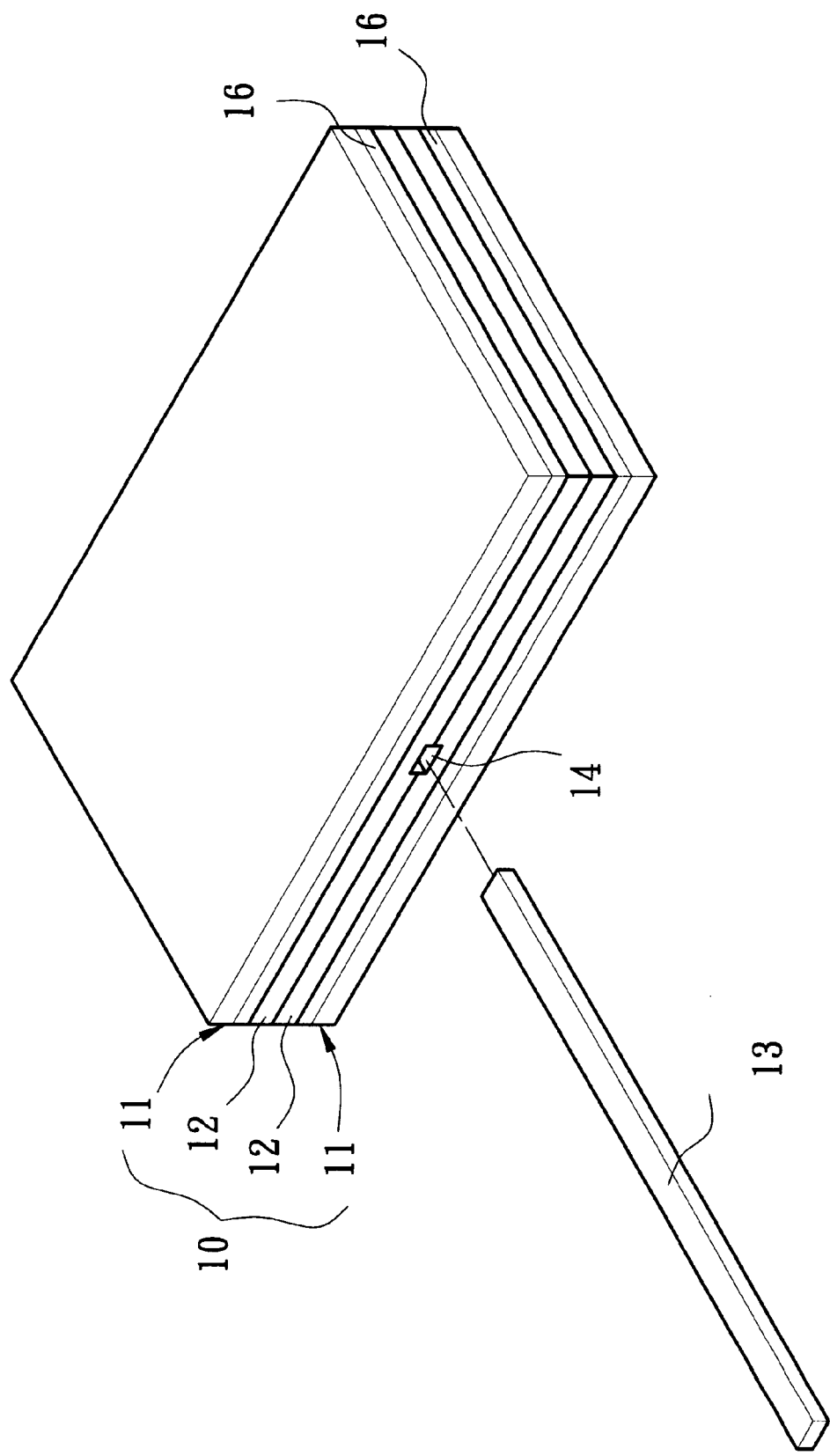
FIG. 1B shows a stack structure of the electric power storage units of an ultracapacitor energy storage device in the prior art, whose side surface is formed with a refill port.
Figure 2A:
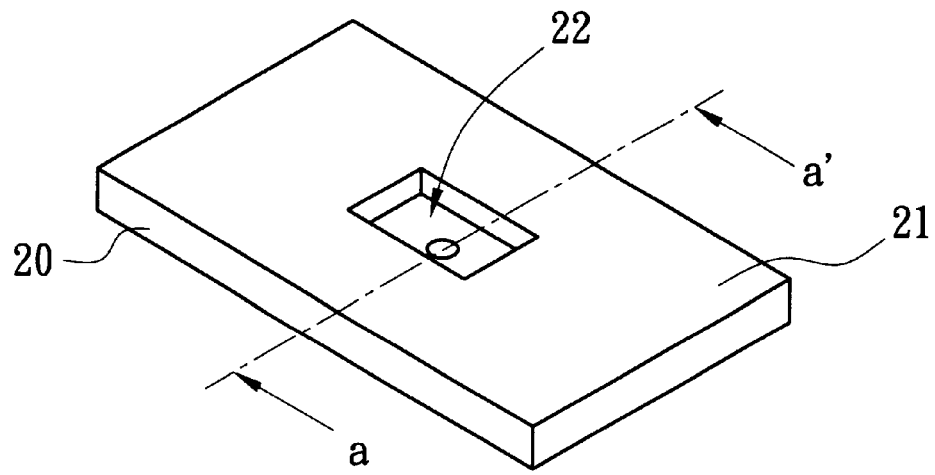
Figure 2B:
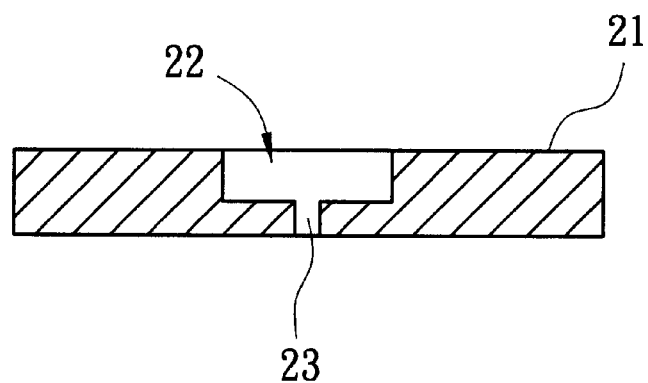

A preferred embodiment of the packaging method for electric power storage units of an ultracapacitor energy storage device is shown in FIGS. 2A and 2B. First, a printing tool 20 is provided. The printing tool 20 includes a top surface 21 and a container 22. The bottom of the container 22 is formed with a vacuum hole 23 which provides vacuum suction.

Figure 3A:
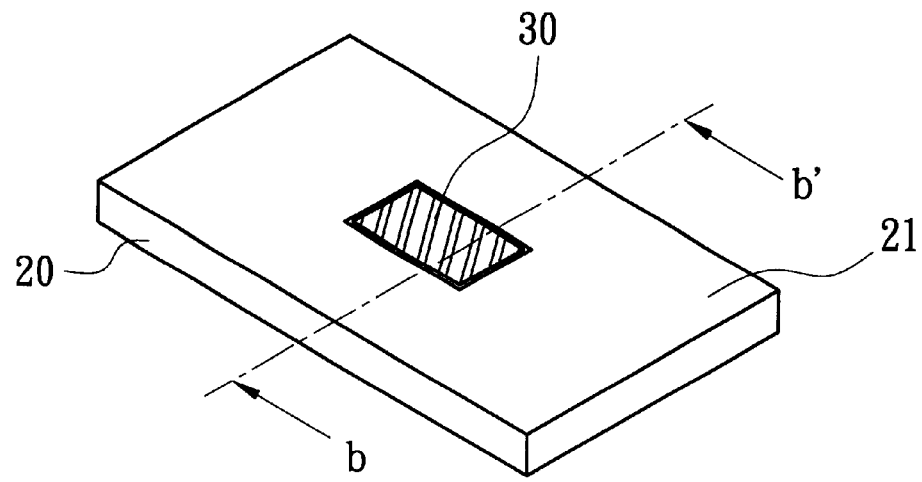
Figure 3B:
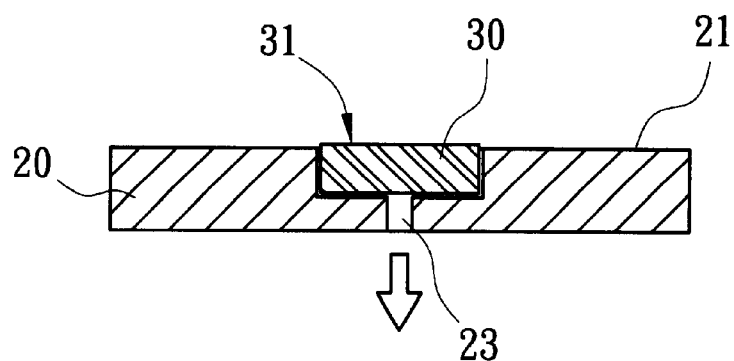

Afterwards, as shown in FIGS. 3A and 3B, a first electrode 30 is disposed in the container 22 of the printing tool 20. The first electrode 30 can be a thin square electrode with a thickness of several mils (1 mil=0.00254 cm). The length of its sides is preferably several to tens of centimeters. Nevertheless, its shape and size are not limited to the above ones.

The shape, size and depth of the container 22 is designed to exactly accommodate the first electrode 30 so that the top surface 31 of the first electrode 30 is roughly as high as the top surface 21 of the printing tool 20.

After the first electrode 30 is put into the container 22, the vacuum hole 23 provides a vacuum suction to hold the first electrode 30 firmly inside the container 22 for subsequent printing processes.

Figure 4:
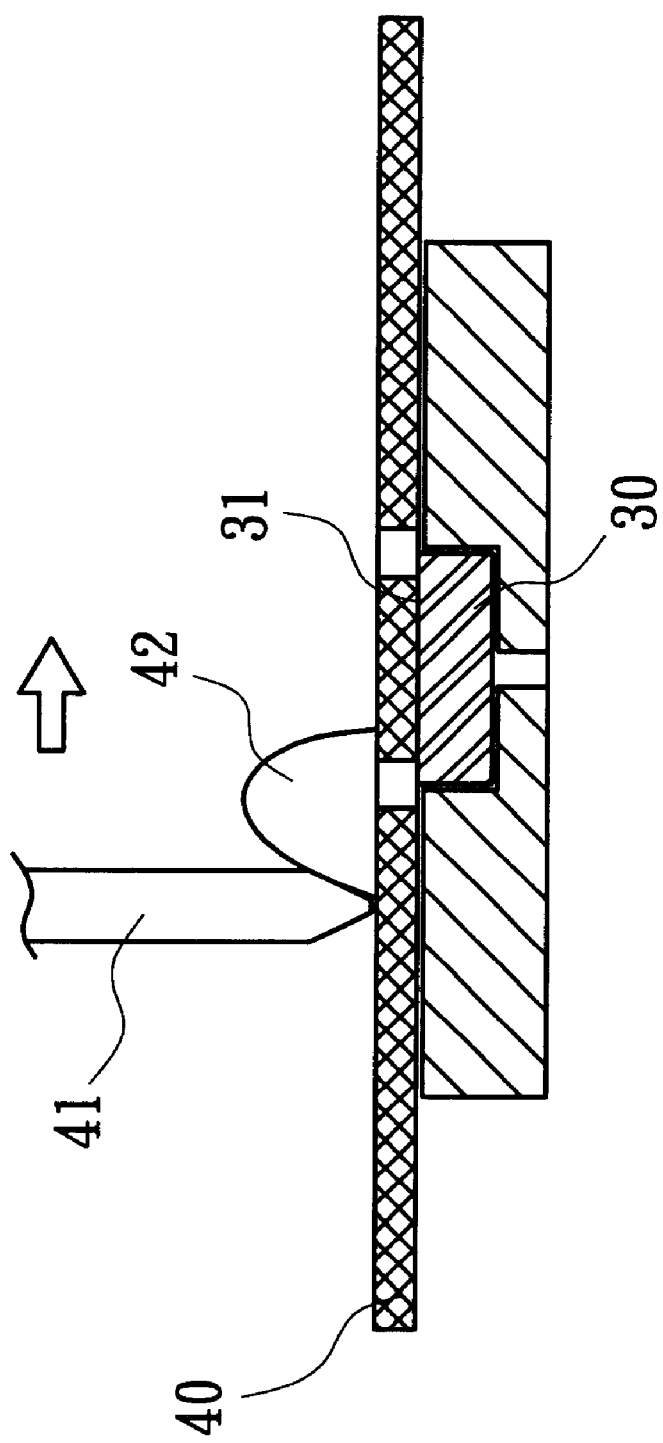
FIG. 4 illustrates that a resin glue is coated on the electrode by half-tone printing in accordance with the embodiment of the invention.

As shown in FIG. 4, a patternized half-tone plate 40 prepared in advance and a scraper 41 are provided to coat resin 42 on the top surface 31 of the electrode 30. The resin is preferably a thermal plastic resin that is acid-resistant, adhesive to the electrode, stable and has a good closure property in the temperature range of −50° C. to 75° C. The resin 42 can be heated to a high temperature, such as 150° C., so as to be reflown into a liquid or semi-solid state for congregation.

Figure 5A:
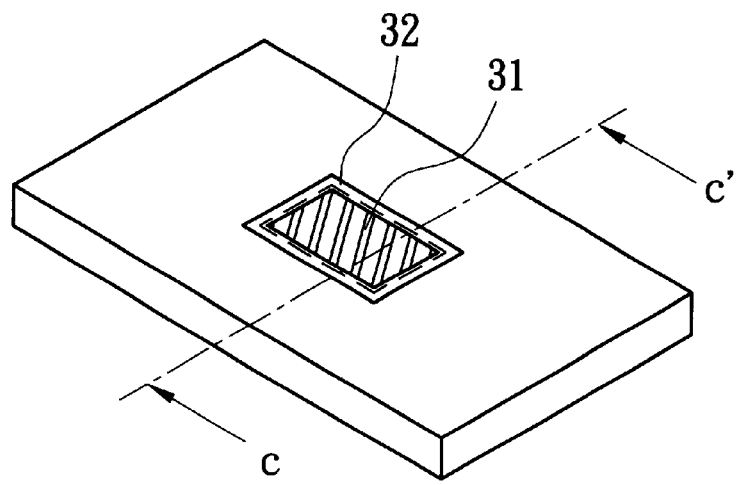
Figure 5B:
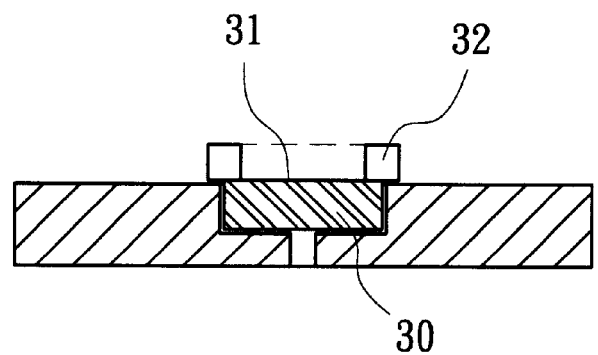

As shown in FIGS. 5A and 5B, the border on the top surface 31 of the first electrode 30 is formed with a first annular glue wall 32 with a height of several mils.

Figure 6:
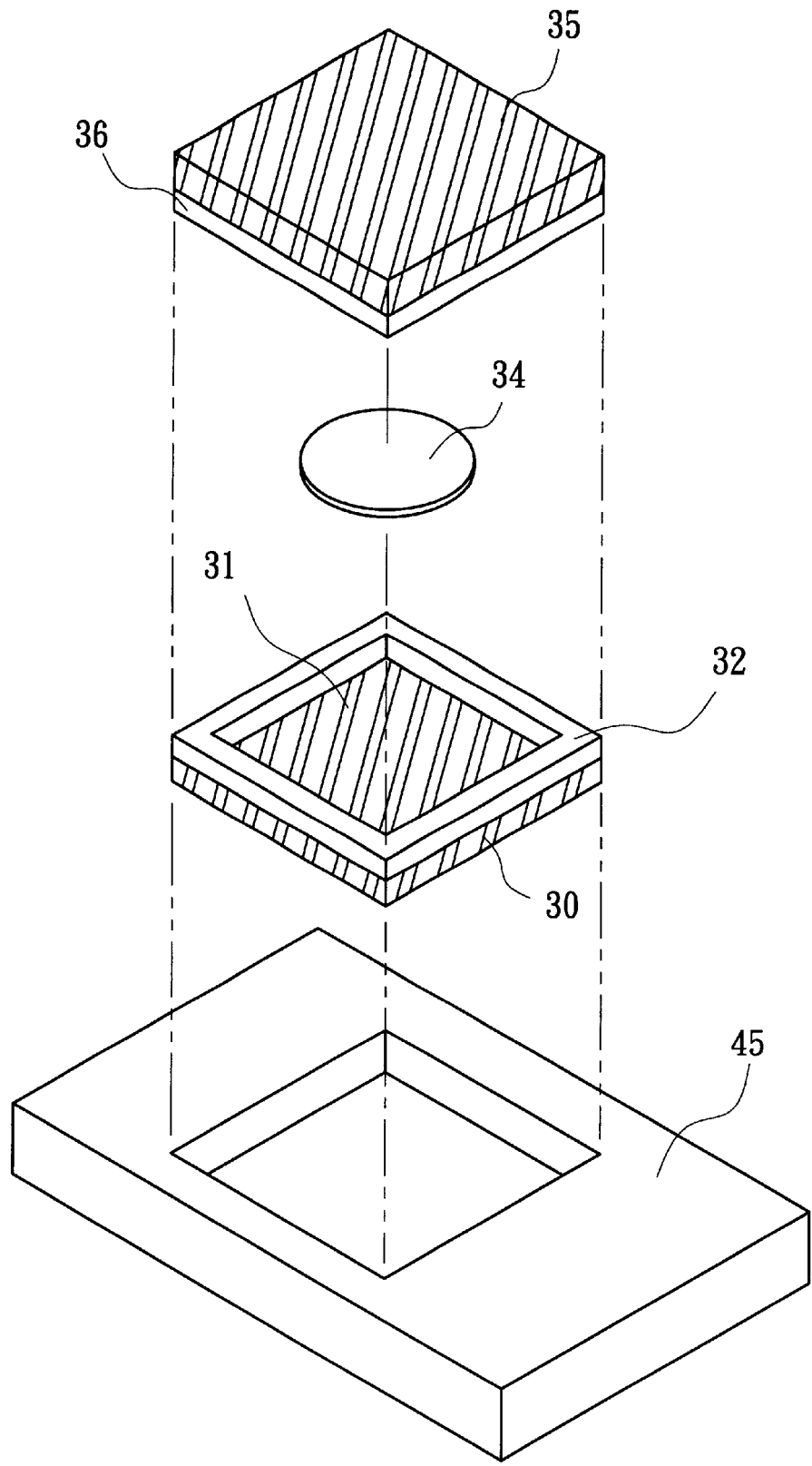
FIG. 6 shows a three-dimensional perspective view of the stack structure of an electric power storage unit on an ultrasonic wave heating device.

With reference to FIG. 6, the first electrode 30 formed with the first annular glue wall 32 is disposed in an ultrasonic tool 45. An electrolyte solution 33 is filled into the top surface of the electrode 30 enclosed by the first annular glue wall 32. A second electrode 35 is then stacked onto the first electrode 30. Usually, the second electrode 35 has the same structure and size as the first electrode 30. Preferably, the bottom surface of the second electrode 35 that faces the first electrode 30 is formed with a second annular glue wall 36 corresponding to the first annular glue wall 32. The formation method for the second annular glue wall 36 can be the same as that for the first annular glue wall 32, i.e., by printing. Before stacking the second electrode 35, it is preferably to dispose a separation plate 34 on the top surface 31 of the first electrode 30.

The separation plate 34 is used as a support structure between the two electrodes 30, 35, preventing the electrodes 30, 35 from direct contact due to bending. The separation plate 34 has to have such properties as being thin, porous and acid-resistant. It can be a glass fiber plate.

Figure 7:
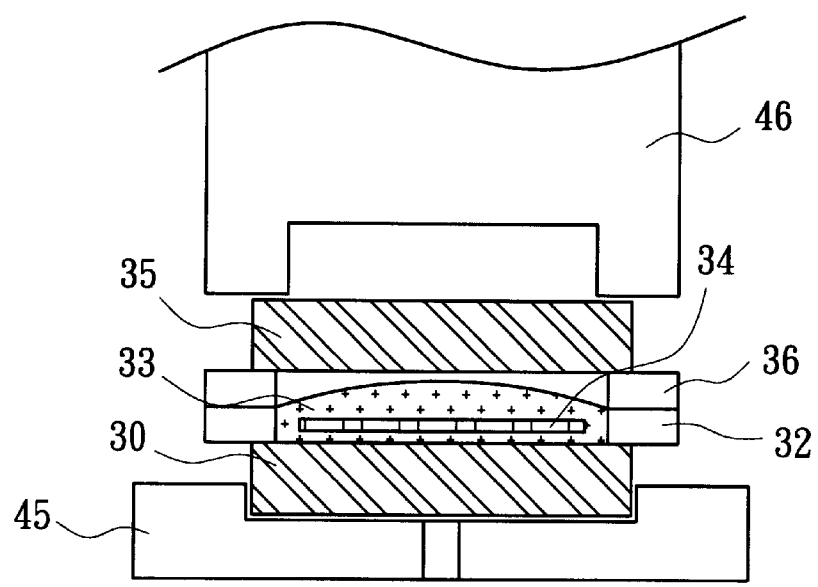
FIG. 7 illustrates local heating on the annular glue wall of the electric power storage unit stack structure using an ultrasonic wave heating device according to the embodiment of the invention.
Figure 8:
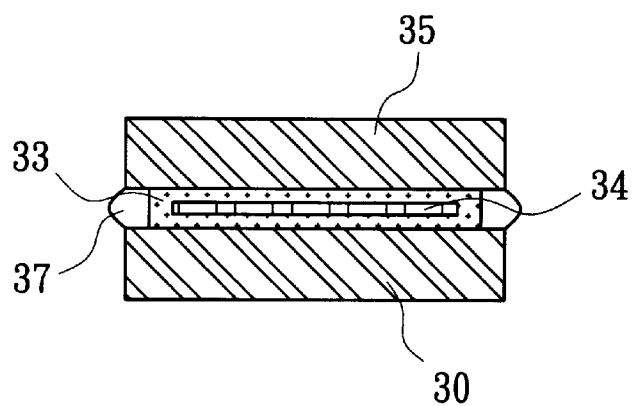
FIG. 8 shows a schematic cross-sectional view of the packaged electric power storage unit after the reflow of the annular glue walls according to the embodiment of the invention.

As shown in FIG. 7, a heating device is employed to heat the first annular glue wall 32 and the second annular glue wall 36. When the temperatures of the first annular glue wall 32 and the second annular glue wall 36 are raised to a certain temperature, they are reflown as shown in FIG. 8 so that the first electrode 30, the second electrode 35, and the reflown annular glue wall 37 are tightly bound together. The electrolyte solution 33 is then enclosed between the first electrode 30 and the second electrode 35. Once the annular glue wall 37 cools down and cures, the packaging of the electric power storage units of an ultracapacitor energy storage device is then completed. The heating device 46 can use ultrasonic waves, hot air, or infrared light.

Although the invention has been described with reference to specific embodiments, this description is not meant to be construed in a limiting sense. Various modifications of the disclosed embodiments, as well as alternative embodiments, will be apparent to persons skilled in the art. For example, the annular glue wall can be made of other proper materials. The method for forming the annular glue walls is not limited to half-tone printing but can be formed by coating. Furthermore, besides local heating using ultrasonic waves, the reflow of the annular glue walls can use other methods. It is, therefore, contemplated that the appended claims will cover all modifications that fall within the true scope of the invention.

What is claimed is:

1. A packaging method for electric power storage units of an ultracapacitor energy storage device, which comprises the steps of:

providing a first electrode and coating an annular glue wall along the border on a top surface of the first electrode;

filling an electrolyte solution on the top surface of the first electrode enclosed by the annular glue wall;

providing a second electrode stacked on the first electrode;

providing a separating plate between said first electrode and said second electrode; and heating and reflowing the annular glue wall to bind the first electrode, the second electrode and the annular glue wall together and to enclose the electrolyte solution and the separating plate between the first electrode and the second electrode with the separating plate not being in contact with said glue wall.

2. The packaging method of claim 1, wherein the annular glue wall is composed of a thermal plastic resin.

3. The packaging method of claim 1, wherein the annular glue wall is formed on the top surface of the first electrode by printing.

4. The packaging method of claim 3, wherein the step of coating an annular glue wall comprises the steps of:
fixing the first electrode on a printing tool; and
applying half-tone printing on the top surface of the first electrode.

5. The packaging method of claim 4, wherein the printing tool has a container whose size and depth are approximately the same of those of the first electrode so as to accommodate the first electrode.

6. The packaging method of claim 5, wherein the bottom of the container has a vacuum hole to suck and hold the first electrode.

7. The packaging method of claim 1, wherein the step of coating an annular glue wall is formed using a glue supplier.

8. The packaging method of claim 1, wherein the annular glue wall is formed by immersing and coating.

9. The packaging method of claim 1, wherein the annular glue wall is formed by spraying and coating.

10. The packaging method of claim 1, wherein the step of coating an annular glue wall further comprises the step of speeding up the binding of the annular glue wall.

11. The packaging method of claim 10, wherein the step of speeding up the binding of the annular glue wall is achieved by heating.

12. The packaging method of claim 11, wherein the heating is done using hot air.

13. The packaging method of claim 11, wherein the heating is done using infrared light.

14. The packaging method of claim 10, wherein the step of speeding up the binding of the annular glue wall is achieved using ultraviolet light.

15. The packaging method of claim 10, wherein the step of speeding up the binding of the annular glue wall is achieved using radiation.

16. The packaging method of claim 1, wherein said separating plate is placed on the top surface of the first electrode.

17. The packaging method of claim 16, wherein the separating plate is porous and acid-resistant.

18. The packaging method of claim 16, wherein the separating plate is a glass fiber plate.

19. The packaging method of claim 1, wherein the step of reflowing the glue wall is done by heating the annular glue wall using a heat source.

20. The packaging method of claim 19, wherein the heat source is an ultrasonic wave.

21. The packaging method of claim 19, wherein the heat source is hot air.

22. The packaging method of claim 19, wherein the heat source is infrared light.

23. A packaging method for electric power storage units of an ultracapacitor energy storage device, which comprises the steps of:
providing a first electrode and coating a first annular glue wall along the border on a top surface of the first electrode, providing a second electrode and coating a second annular glue wall along the border on a bottom surface of the first electrode with the second annular glue wall corresponding to the first annular glue wall;
filling an electrolyte solution on the top surface of the first electrode enclosed by the annular glue wall;
providing a separating plate between said first electrode and said second electrode;
stacking the second electrode on the first electrode; and
heating and reflowing the first annular glue wall and the second annular glue wall to bind the first electrode, the second electrode, the first annular glue wall, and the second annular glue wall together and to enclose the electrolyte solution and the separating plate between the first electrode and the second electrode with the separating plate not being in contact with the said first and second glue walls.

24. The packaging method of claim 23, wherein the first annular glue wall is composed of a thermal plastic resin.

25. The packaging method of claim 23, wherein the first annular glue wall is formed on the top surface of the first electrode by printing.

26. The packaging method of claim 25, wherein the step of coating an annular glue wall comprises the steps of:
fixing the first electrode on a printing tool; and
applying half-tone printing on the top surface of the first electrode.

27. The packaging method of claim 26, wherein the printing tool has a container whose size and depth are approximately the same of those of the first electrode so as to accommodate the first electrode.

28. The packaging method of claim 27, wherein the bottom of the container has a vacuum hole to suck and hold the first electrode.

29. The packaging method of claim 23, wherein the step of coating a first annular glue wall is formed using a glue supplier.

30. The packaging method of claim 23, wherein the first annular glue wall is formed by immersing and coating.

31. The packaging method of claim 23, wherein the first annular glue wall is formed by spraying and coating.

32. The packaging method of claim 23, wherein the step of coating a first annular glue wall further contains the step of speeding up the binding of the first annular glue wall.

33. The packaging method of claim 32, wherein the step of speeding up the binding of the first annular glue wall is achieved by heating.

34. The packaging method of claim 33, wherein the heating is done using hot air.

35. The packaging method of claim 33, wherein the heating is done using infrared light.

36. The packaging method of claim 32, wherein the step of speeding up the binding of the first annular glue wall is achieved using ultraviolet light.

37. The packaging method of claim 32, wherein the step of speeding up the binding of the first annular glue wall is achieved using radiation.

38. The packaging method of claim 23, wherein the second annular glue wall is composed of a thermal plastic resin.

39. The packaging method of claim 23, wherein the second annular glue wall is formed on the top surface of the first electrode by printing.

40. The packaging method of claim 39, wherein the printing method in the step of coating a first annular glue wall comprises:
fixing the second electrode on a printing tool; and
applying half-tone printing on the top surface of the second electrode.

41. The packaging method of claim 40, wherein the printing tool has a container whose size and depth are approximately the same of those of the second electrode so as to accommodate the second electrode.

42. The packaging method of claim 41, wherein the bottom of the container has a vacuum hole to suck and hold the second electrode.

43. The packaging method of claim 23, wherein the step of coating a second annular glue wall is formed using a glue supplier.

44. The packaging method of claim 23, wherein the second annular glue wall is formed by immersing and coating.

45. The packaging method of claim 23, wherein the second annular glue wall is formed by spraying and coating.

46. The packaging method of claim 23, wherein the step of coating a second annular glue wall further contains the step of speeding up the binding of the second annular glue wall.

47. The packaging method of claim 46, wherein the step of speeding up the binding of the second annular glue wall is achieved by heating.

48. The packaging method of claim 47, wherein the heating is done using hot air.

49. The packaging method of claim 47, wherein the heating is done using infrared light.

50. The packaging method of claim 46, wherein the step of speeding up the binding of the second annular glue wall is achieved using ultraviolet light.

51. The packaging method of claim 46, wherein the step of speeding up the binding of the second annular glue wall is achieved using radiation.

52. The packaging method of claim 23, wherein said separation plate is disposed on the top surface of the second electrode.

53. The packaging method of claim 52, wherein the separation plate is porous and acid-resistant.

54. The packaging method of claim 52, wherein the separation plate is a glass fiber plate.

55. The packaging method of claim 23, wherein the step of reflowing uses a heat source to heat the first annular glue wall and the second annular glue wall.

56. The packaging method of claim 55, wherein the step of reflowing uses ultrasonic waves to heat the first annular glue wall and the second annular glue wall.

57. The packaging method of claim 55, wherein the step of reflowing uses hot air to heat the first annular glue wall and the second annular glue wall.

58. The packaging method of claim 55, wherein the step of reflowing uses infrared light to heat the first annular glue wall and the second annular glue wall.

* * * * *